(12) United States Patent
Vogt

(10) Patent No.: US 6,170,834 B1
(45) Date of Patent: Jan. 9, 2001

(54) SEALING ARRANGEMENT

(75) Inventor: Rolf Vogt, Oftersheim (DE)

(73) Assignee: Firma Carl Freudenberg, Weinheim (DE)

( * ) Notice: Under 35 U.S.C. 154(b), the term of this patent shall be extended for 0 days.

(21) Appl. No.: 09/083,076

(22) Filed: May 21, 1998

(30) Foreign Application Priority Data

May 23, 1997 (DE) .............................. 197 21 692

(51) Int. Cl.⁷ .............................. F16J 15/54; F16J 15/32
(52) U.S. Cl. .......................................... 277/559; 277/571
(58) Field of Search ................................... 277/559, 571

(56) References Cited

U.S. PATENT DOCUMENTS

| | | | |
|---|---|---|---|
| 3,259,393 | * | 7/1966 | Dega ..................................... 277/559 |
| 5,044,642 | * | 9/1991 | Vogt et al. ........................... 277/559 |
| 5,350,181 | * | 9/1994 | Horve ..................................... 277/559 |

FOREIGN PATENT DOCUMENTS 15433   4/1895   (DE) .

* cited by examiner

*Primary Examiner*—Anthony Knight
*Assistant Examiner*—E Peavey
(74) *Attorney, Agent, or Firm*—Kenyon & Kenyon

(57) ABSTRACT

A sealing arrangement, including a surface to be sealed off of a rotationally symmetrical machine element and a radial shaft sealing ring. The sealing ring has a sealing lip made of polymer material, which contacts the surface along a sealing edge that is formed of two mutually intersecting conical surfaces, the first conical surface, facing the space to be sealed off, forming a steeper angle with the axis of rotation than the conical surface facing away from it. A spiral-shaped groove having a rounded groove bottom is recessed into the surface, the groove bottom has a radius of curvature of 0.4 to 1.6 mm, and the depth of the groove is less than 15 μm.

10 Claims, 4 Drawing Sheets

SEALING ARRANGEMENT

TECHNICAL AREA

The invention relates to a sealing arrangement providing a rotationally induced return flow effect by utilizing a groove with respect to a sealing surface, and a method for manufacturing the surfaces to be sealed.

BACKGROUND OF THE INVENTION

A sealing arrangement of this type and a method are disclosed in German Published Unexamined Application DE-OS 15 433. To achieve a rotationally induced return flow effect, provision is made for a shaft having grooves applied at an angle with respect to the longitudinal axis. The return flow effect, after a short period of operation, is eliminated at the place where the radial shaft sealing ring exerts the greatest pressure, due to the deformation and the wear associated therewith, so that the sealing ring cannot be subject to any further wear at all. In the immediate vicinity of this now eliminated return flow effect, the existing grooves continue to exhibit a return-flow effect, as before. The document indicates that a return-flow thread would destroy the sealing edge of the radial shaft sealing ring.

The grooves are produced by a simple plunge-cutting (gashing) procedure, as for example, by means of rotating grinding disks or using a polishing disk furnished with abrasive powder. In grinding the surfaces, a disadvantage lies in the unpredictable nature of the outcome, i.e., whether the sealing arrangement will provide an adequate sealing action during normal use. The ground surface has an unpredictable number of spiral-shaped, multi-thread grooves of various depths. The number and form of the threads continuously changes in unpredictable ways during the manufacturing of the surface, depending on the condition of the grinding disk, the vibration response of the drive shaft of the grinding disk, the vibration response of the drive shaft of the grinding disk, and/or of the surface to be ground, and the spacial relationship of the rotating axes with respect to each other. Given the typically randomly developed form of the multi-thread grooves on the surface, the volume of the medium to be sealed within the grooves may be so great that the radial shaft sealing ring is no longer able to convey the medium to be sealed back into the space to be sealed off.

SUMMARY OF THE INVENTION

The invention is based on the object of further refining a sealing arrangement of the type described above, such that the spiral grooving that gives rise to the return flow effect can be more reliably manufactured. Consequently, the surface properties, including the dimensions of the groove, can be measured on the surface with metrological means and suitably quantified. This permits clear, quantifiable associations to be formed between the geometry of the groove and the resulting sealing effects that the arrangement provides to the radial shaft sealing ring. The surface should be so constituted that the radial shaft sealing ring can, regardless of the direction of rotation of the machine element, return the volumes of fluid necessary for lubricating the sealing edge into the space to be sealed.

In brief, the invention provides a sealing arrangement, in which a rotationally symmetrical machine element having a surface against which a seal is established to be machine cut to produce a groove, the groove having a rounded groove bottom that is recessed into the surface. The groove bottom has a radius of curvature of 0.4 to 1.6 mm, and a depth of less than 15 $\mu$m. The radial shaft sealing ring has a polymeric sealing lip which contacts the surface of the machine element that bears the groove via a sealing edge that is formed by two intersecting conical surfaces, the first conical surface, facing in the direction of a space to be sealed off, having a steeper conical angle with respect to the axis of rotation of the machine element than the conical surface facing away therefrom. The width of sealing ring along which the seal is established is 1.5 to 4 times greater than the pitch of the groove.

In the invention, as noted, provision is made for a spiral-shaped groove having a rounded groove bottom to be machine-cut into the surface, and for the groove bottom to have a radius of curvature of 0.4 to 1.6 mm, and for the depth of the groove to be less than 15 $\mu$m. In contrast to ground surfaces, machine-cut surfaces are substantially less expensive to manufacture. Moreover, the return flow effect produced on the surface in the machine-cutting process has the advantage that it can be measured by metrological means, and quantified in terms of its effects on the sealing action of the radial shaft sealing rings. Therefore, it is possible to check, simply and cost-effectively, whether the machine-cut surface has been manufactured according to specifications, and whether the required parameters have been complied with. Depending on the direction of rotation, the machine-cut surface conveys the medium to be sealed off more or less vigorously along the surface in the axial direction. With a radius of curvature of 0.4 to 1.6 mm and a groove depth of less than 15 $\mu$m, the radial shaft sealing ring is able, regardless of the turning direction of the machine element, to return the volumes of medium to be sealed off needed for lubricating the sealing edge, into the space to be sealed. The reverse-flow effect of the radial shaft sealing ring is conditioned upon the two conical surfaces, the first conical surface, facing the space to be sealed off, forming a steeper cone angle with the axis of rotation than the second conical surface, facing away therefrom.

The groove depth is preferably no greater than 10 $\mu$m. As a result of the lesser groove depth, the wear that occurs during the course of operation at the sealing edge of the radial shaft sealing ring is reduced, so that the sealing arrangement of the present invention exhibits further improved working properties over a longer service life.

The adjacent groove spirals preferably are spaced apart at their midpoints by 0.03 to 0.3 mm. At midpoint clearances of up to 0.3 mm, the delivery, conditional upon the rotationally induced return flow of the medium to be sealed off, out of the space to be sealed off, regardless of the direction of rotation of the machine element, is in any case so slight that reliable sealing action is assured by the radial shaft sealing ring. Midpoint distances of less than 0.03 mm are hardly practicable, since such a surface requires a comparatively long machining time, and it becomes clearly more difficult to measure the mechanical dimensions giving rise to the return flow effect using metrological means.

To achieve good working characteristics over a long service life, provision is made that the width of the sealing edge of the seal employed 1.5 be 4 times greater than the pitch of the groove.

The machine element can be constituted by a shaft or the barrel ring (or race) of a cassette seal.

The invention relates, moreover, to a method for manufacturing a sealing-arrangement surface to be sealed off. To achieve this object, machine-cutting takes place across the surface with a feed rate of 0.03 to 0.3 mm, a cutting speed of 80 to 400 m/min., and a cutting depth of 0.04 to 0.4 mm.

Using such a method, one attains a mean roughness value $R_a$, according to German Industrial standard DIN 4762, of 0.05 to 2 μm. The mean roughness value $R_a$ is the arithmetic mean of all profile values of the roughness profile. In addition, a peak-to-valley height $R_z$ of 0.2 to 10 μm, according to German Industrial standard DIN 4768, is achieved. The mean peak-to-valley height $R_z$ is the mean value of the individual peak-to-valley heights of successive, individual measured distances.

The maximal peak-to-valley height $R_{max}$, according to DIN 4768, is the largest individual peak-to-valley height within the entire measured distance and, in the above described method, amounts to a maximum of 15 μm.

BRIEF DESCRIPTION OF DRAWINGS

The sealing arrangement and the method for manufacturing the surface bearing the groove are further described in conjunction with the drawings, in which.

DETAILED DESCRIPTION

Figure 1:
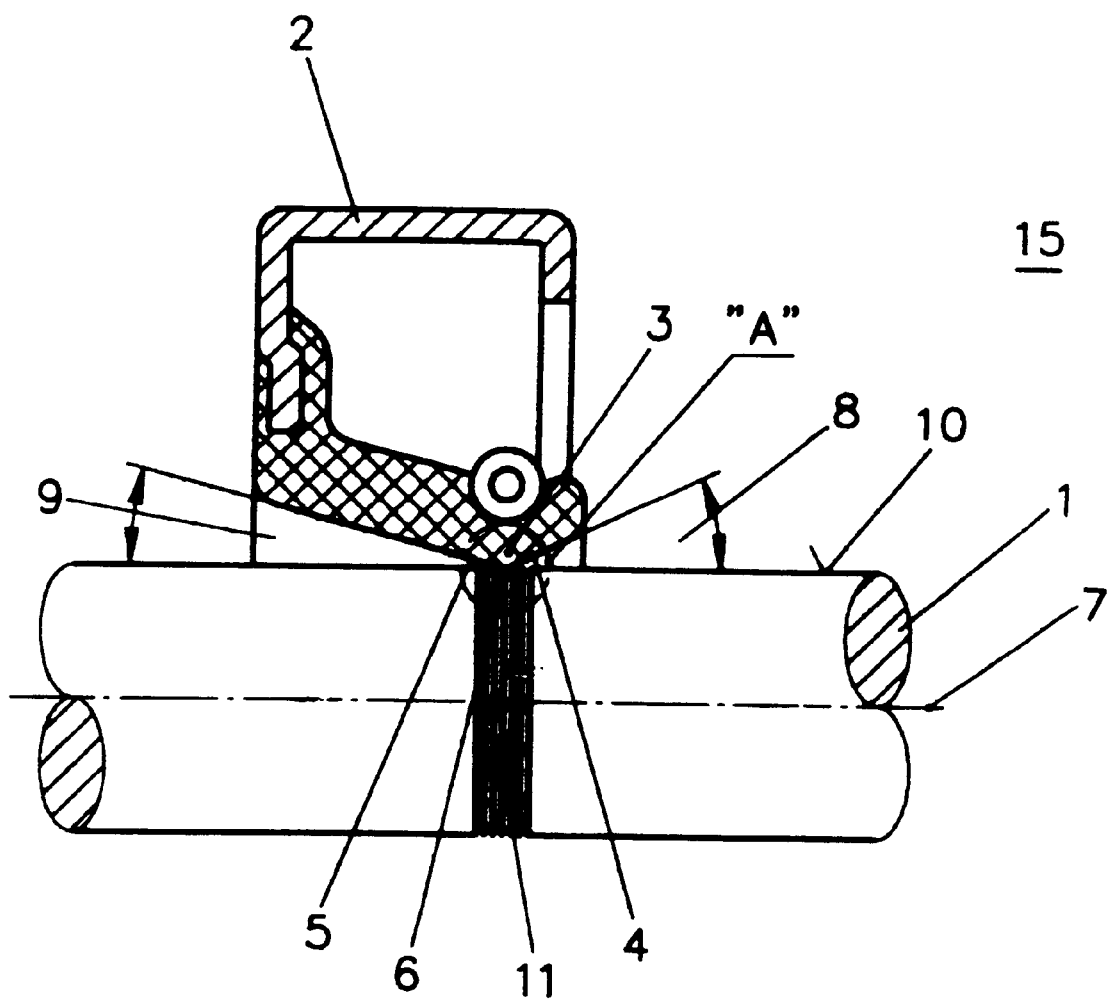
FIG. 1 is a partial cross-sectional view of a first exemplary embodiment of the sealing arrangement of the present invention, in which the machine element is configured as a shaft.

In FIG. 1, a first exemplary embodiment of a sealing arrangement is shown, in which machine element 1 is in the form of a shaft against which a seal is to be provided, the shaft being surrounded on its outer periphery by a radial shaft sealing ring 2. Sealing lip 3 of radial shaft sealing ring 2 has a sealing edge 6, which is bounded by two mutually intersecting conical surfaces 4 and 5. The medium to be sealed off is contained inside the space to be sealed off, which is designated by reference numeral 15.

First conical surface 4, facing the sealed-off space 15, forms a first conical angle 8 with respect to the axis of rotation 7. The first conical angle 8 is greater than second conical angle 9, which is defined by second conical surface 5 with respect to the axis of rotation 7. Sealing lip 6 sealingly contacts surface 10 sealingly with a degree of radial pre-stressing. The width of sealing edge 6 is 1.5 to 4 times larger than the pitch of groove 11, so that even when machine element 1 is stationary, a good static seal is ensured.

Figure 3:
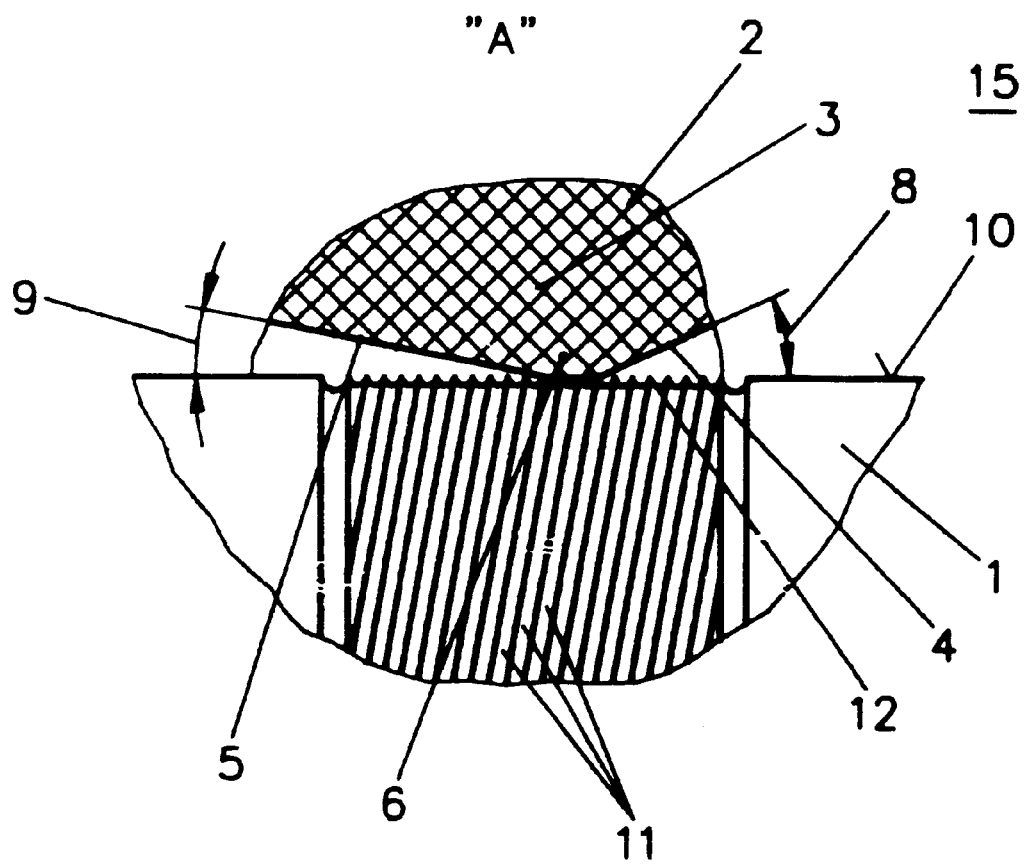
FIG. 3 shows the enlarged segment "A" from FIGS. 1 and 2.
Figure 4:
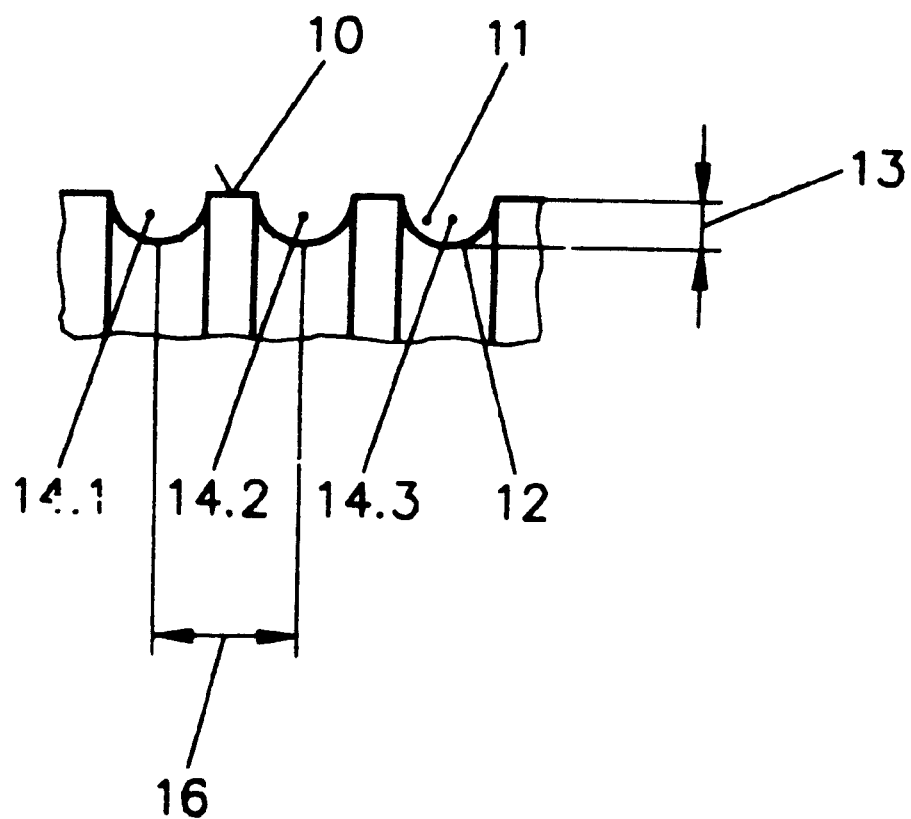
FIG. 4 provides an enlarged view of the surface of the machine element.

As is illustrated in FIGS. 3 and 4, the partial area of surface 10 that forms the contact surface for sealing edge 6 is provided with at least one spiral-shaped groove 11, which has a rounded groove bottom 12. The groove bottom 12 has a radius of curvature of 0.4 to 1.6 mm, and, in the illustrated embodiment, 1.0 mm.

Figure 2:
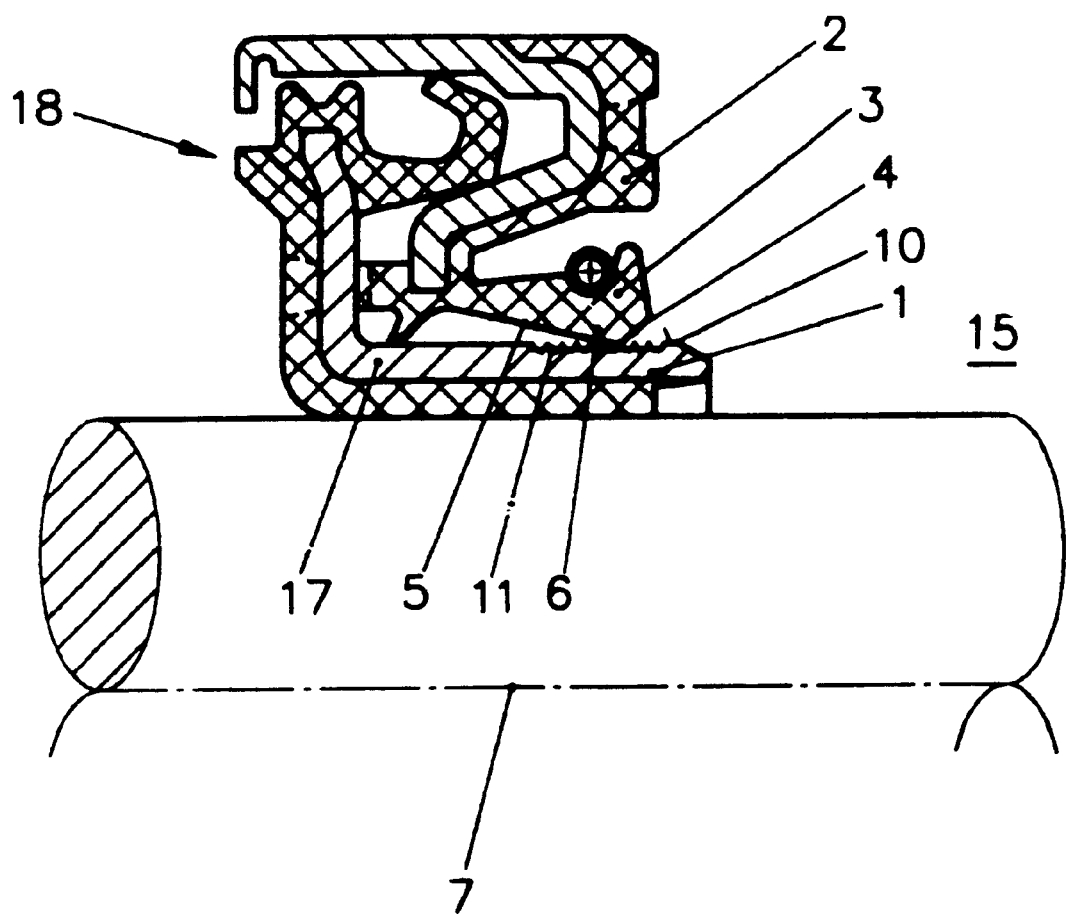
FIG. 2 is a partial sectional view of a second embodiment of the sealing arrangement of the present invention, in which the machine element is configured as the barrel ring of a cassette seal.

FIG. 2 shows a second embodiment of the sealing arrangement of the present invention, and it differs from the first embodiment in FIG. 1 in that machine element 1 against which a seal is formed takes the form of a barrel ring 17 of a cassette seal 18 which has a machine-cut surface 10.

In the illustrated embodiment, only a portion of the axial extent of this surface bears the thread; however, it is possible to manufacture the entire surface 10 using the method recited herein.

In this context, machine-cutting across surface 10 takes place with a feed rate of 0.03 to 0.3 mm, a cutting speed of 80 to 400 m/min, and a cutting depth of 0.04 to 0.4 mm.

It is particularly simple and inexpensive to manufacture a machine-cut surface 10 as a contact surface for radial shaft sealing ring 2. The return flow effect created on surface 10 by the method of the present invention, can be precisely measured using metrological means and quantified, with respect to its effects on the sealing action of the radial shaft sealing ring, since the return flow effect made possible by the machine-cutting operation is dependent upon the thread pitch geometry, which in turn corresponds to the feed rate.

The advantage of the sealing arrangement of the present invention lies in the fact that, when the mentioned parameters are complied with, radial shaft sealing ring 2, as a result of the shape and arrangement of both of its conical surfaces 4 and 5, and regardless of the direction of rotation of machine element 1, returns the medium to be sealed off in the direction of sealed-off space 15, even when groove 11 is recessed into surface 10 in such a way that it would otherwise be associated with leakage of the fluid axially out of space 15.

What is claimed is:

1. A sealing arrangement, comprising:
   a rotationally symmetrical machine element having a surface against which a seal is to be provided along a region of the surface bearing a groove, the groove having a rounded groove bottom that is recessed into the surface, the groove bottom having a radius of curvature of 0.4 to 1.6 mm, and the groove having a depth of less than 15 μm; and
   a radial shaft sealing ring having a polymeric sealing lip which contacts the surface of the machine element that bears the groove via a sealing edge that is formed by two intersecting conical surfaces, the first conical surface, facing in the direction of a space to be sealed off, having a steeper conical angle with respect to the axis of rotation of the machine element than the conical surface facing away therefrom.

2. The sealing arrangement as defined by claim 1, wherein the groove has a maximum depth 10 μm.

3. The sealing arrangement as defined by claim 2, wherein adjacent groove threads are spaced apart at their midpoints by 0.03 to 0.3 mm.

4. The sealing arrangement as defined by claim 1, wherein adjacent groove threads are spaced apart at their midpoints by 0.03 to 0.3 mm.

5. The sealing arrangement as defined by claim 4, wherein the width of that portion of the sealing ring along which the seal is established is 1.5 to 4 times greater than the pitch of the groove.

6. The sealing arrangement as defined by claim 1, wherein the width of that portion of the sealing ring along which the seal is established is 1.5 to 4 times greater than the pitch of the groove.

7. The sealing arrangement as defined by claim 6, wherein the machine element comprises a shaft.

8. The sealing arrangement as defined by claim 6, wherein the machine element comprises a barrel ring of a cassette seal.

9. The sealing arrangement as defined by claim 1, wherein the machine element comprises a shaft.

10. The sealing arrangement as defined by claim 1, wherein the machine element comprises a barrel ring of a cassette seal.

* * * * *